(12) United States Patent
Das

(10) Patent No.: US 10,446,174 B2
(45) Date of Patent: Oct. 15, 2019

(54) FILE SYSTEM FOR SHINGLED MAGNETIC RECORDING (SMR)

(71) Applicant: Microsoft Technology Licensing, LLC, Redmond, WA (US)

(72) Inventor: Rajsekhar Das, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 15/607,003

(22) Filed: May 26, 2017

(65) Prior Publication Data

US 2018/0342261 A1  Nov. 29, 2018

(51) Int. Cl.
| | |
|---|---|
| *G06F 12/08* | (2016.01) |
| *G11B 5/012* | (2006.01) |
| *G11B 5/09* | (2006.01) |
| *G11B 20/10* | (2006.01) |
| *G06F 12/0802* | (2016.01) |

(Continued)

(52) U.S. Cl.
CPC .............. *G11B 5/012* (2013.01); *G06F 3/061* (2013.01); *G06F 3/0631* (2013.01); *G06F 3/0635* (2013.01); *G06F 3/0685* (2013.01); *G06F 12/0802* (2013.01); *G11B 5/09* (2013.01); *G11B 20/10009* (2013.01); *G06F 3/0643* (2013.01); *G06F 2212/205* (2013.01); *G06F 2212/206* (2013.01); *G06F 2212/217* (2013.01); *G11B 2020/1292* (2013.01)

(58) Field of Classification Search
None
See application file for complete search history.

(56) References Cited

U.S. PATENT DOCUMENTS

| | | | |
|---|---|---|---|
| 9,361,937 B2 | 6/2016 | Pitchumani et al. | |
| 9,368,130 B2 * | 6/2016 | Jin | G11B 5/012 |

(Continued)

FOREIGN PATENT DOCUMENTS

WO    2016209667 A1    12/2016

OTHER PUBLICATIONS

Crump, George, "Flash + SMR = Storage Density and Performance", https://storageswiss.com/2016/02/01/flash-smr-storage-density-and-performance/, Published on: Feb. 1, 2016, (6 pages total).

(Continued)

*Primary Examiner* — Kevin Verbrugge
(74) *Attorney, Agent, or Firm* — Mark K. Young; Mayer & Williams PC

(57) ABSTRACT

A file system executing on a computing system is configured to efficiently manage and store data on a tiered storage volume using hybrid media that includes a shingled magnetic recording (SMR) data store, such as an SMR disk drive, and a randomly-writable data store, such as a conventional magnetic recording (CMR) disk or solid-state drive (SSD) using flash memory. Write operations in the SMR disk are performed in a sequential manner to optimize storage density on the disk. The file system utilizes logic incorporated in an allocator that monitors I/O operations on the computing system—for example, write requests from applications executing on the system—to determine if a request is associated with file data or metadata. If the request is for metadata, then the allocator allocates space on the SSD/CMR for the metadata, and if the request is for file data, then space is allocated on the SMR disk.

19 Claims, 12 Drawing Sheets

(51) Int. Cl.
*G06F 3/06* (2006.01)
*G11B 20/12* (2006.01)

(56) References Cited

U.S. PATENT DOCUMENTS

| | | | |
|---|---|---|---|
| 2013/0232292 A1* | 9/2013 | Bandic | G06F 3/061 |
| | | | 711/103 |
| 2014/0019680 A1* | 1/2014 | Jin | G11B 5/012 |
| | | | 711/112 |
| 2014/0115238 A1 | 4/2014 | Xi et al. | |
| 2015/0339319 A1 | 11/2015 | Malina | |
| 2016/0077988 A1 | 3/2016 | Tipton et al. | |
| 2017/0031630 A1 | 2/2017 | Dawkins et al. | |
| 2017/0090775 A1 | 3/2017 | Kowles | |
| 2017/0091048 A1* | 3/2017 | Xiao | G06F 11/1451 |
| 2017/0315913 A1* | 11/2017 | Jibbe | G06F 12/0802 |
| 2018/0121133 A1* | 5/2018 | Bakke | G06F 3/061 |
| 2018/0365145 A1* | 12/2018 | Jibbe | G11B 20/10527 |

OTHER PUBLICATIONS

"Shingled Magnetic Recording (SMR): Layout Designs, Performance Evaluations and Applications", http://cris.cs.umn.edu/research.htm, Retrieved on: May 11, 2017, (4 pages total).

"SMR meets Flash with Symphonic Cooperative Flash Management", http://www.radianmemory.com/about/news/smr-meet-flash/, Published on: 2015, (2 pages total).

"International Search Report & Written Opinion Issued in PCT Application No. PCT/US2018/029244", dated Jun. 27, 2018, 13 Pages.

\* cited by examiner

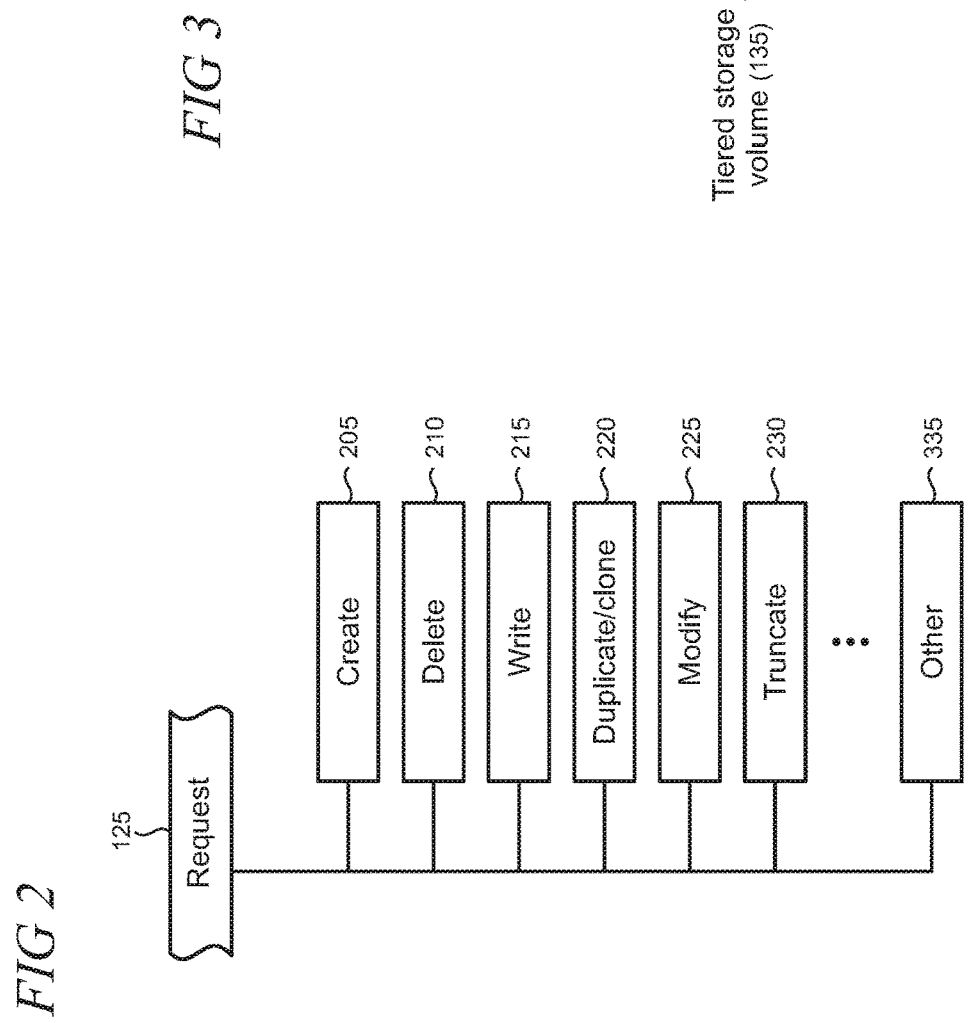

FILE SYSTEM FOR SHINGLED MAGNETIC RECORDING (SMR)

BACKGROUND

Computing systems have become ubiquitous, ranging from small embedded devices to smartphones, wearable computers, and tablets to personal computers (PCs) and backend servers. Each of these computing systems includes some type of data storage and typically, many different types of data storage. For example, a computing system may include solid-state storage and a hard drive or set of hard drives. The solid-state storage may be able to handle read and write input and output (I/O) requests more quickly than the hard drive, but may not have the equivalent storage capacity of the hard drive. Other media such as tape drives, DVDs (or other optical media) or other kinds of media may have different advantages and disadvantages when reading, writing, and storing data.

SUMMARY

A file system executing on a computing system is configured to efficiently manage and store data on a tiered storage volume using hybrid media that includes a shingled magnetic recording (SMR) data store, such as an SMR disk drive, and a randomly-writable data store, such as a conventional magnetic recording (CMR) disk or solid-state drive (SSD) using flash memory. Write operations in the SMR disk are performed in a sequential manner to optimize storage density on the disk. The file system utilizes logic incorporated in an allocator that monitors I/O operations on the computing system—for example, write requests from applications executing on the system—to determine if a request is associated with file data or metadata. If the request is for metadata, then the allocator allocates space on the SSD or CMR for the metadata, and if the request is for file data, then space is allocated on the SMR disk. This allocation technique enables the increased storage density of an SMR disk to be realized without any loss of file system performance or efficiency when storing small data sets like metadata. The file system implements a firewall between the SSD/CMR and SMR tiers of the storage volume which operates to keep the file data and metadata allocation distinct so that state of each data store may be separately maintained.

The file system internally divides an SMR disk into bands which are large relative to typical I/O, for example, 256 MB. Bands are further subdivided into smaller clusters of 4 KB to 64 KB. The file system can independently track bands and clusters. Deferred allocation of space in the tiered storage volume may also be utilized in which the allocator provides a promise token in response to an I/O request from an application. The allocator tracks the clusters which are spoken for with a given promise, but does not actually allocate the clusters in an allocation table or bitmap. The promise functions as a guarantee of an allocation for the application which is converted to a real allocation on the tiered storage volume upon an actual write operation to the SMR disk. The deferred allocation has the benefit of batching allocations into larger runs which increases efficiency of the sequential writes to the SMR disk and improves SMR disk utilization through reduced fragmentation, especially for files that grow slowly. The deferred allocation can also enable allocations to be contiguously maintained when there are several files growing simultaneously.

The file system may further be configured with a redirection table that enables compaction to be applied to the SMR disk to free up space for new data. The redirection table enables the file system to track file contents in allocated portions of bands and aggregate and rewrite the allocated portions into an open band, dynamically in real time. As the rewrites are performed in an efficient sequential manner, additional storage density on the disk may be realized.

Advantageously, the present file system for SMR enables the computing system itself to operate with improved efficiency and performance by optimizing the utilization of the hybrid media in the tiered storage volume according to data type (i.e., metadata or file data) which are kept separate by the firewall. The deferred allocation technique further enhances computing system operational efficiency by delaying processing which can reduce central processing unit (CPU) usage and by batching allocations to thereby optimize band utilization when performing sequential writes. The compaction feature enables allocation portions of bands to be aggregated and transferred to a free band on the SMR disk using the efficient sequential write process to maximize disk utilization and storage density.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 2 shows an illustrative taxonomy of application requests for resources or services;

FIG. 3 shows a block diagram of an illustrative memory and storage arrangement that may be instantiated on a computing system;

Like reference numerals indicate like elements in the drawings. Elements are not drawn to scale unless otherwise indicated.

DETAILED DESCRIPTION

Illustrative embodiments described herein may implement various types of computing systems. These computing systems are now increasingly taking a wide variety of forms. Computing systems may, for example, be handheld devices such as smartphones or feature phones, appliances, laptop computers, wearable devices, desktop computers, mainframes, distributed computing systems, or even devices that have not conventionally been considered a computing system. In this description and in the claims, the term "computing system" is defined to include any device or system (or combination thereof) that includes at least one physical and tangible processor, and a physical and tangible memory device capable of having thereon computer-executable instructions that may be executed by the processor. A computing system may be distributed over a network environment and may include multiple constituent computing systems.

Figure 1:
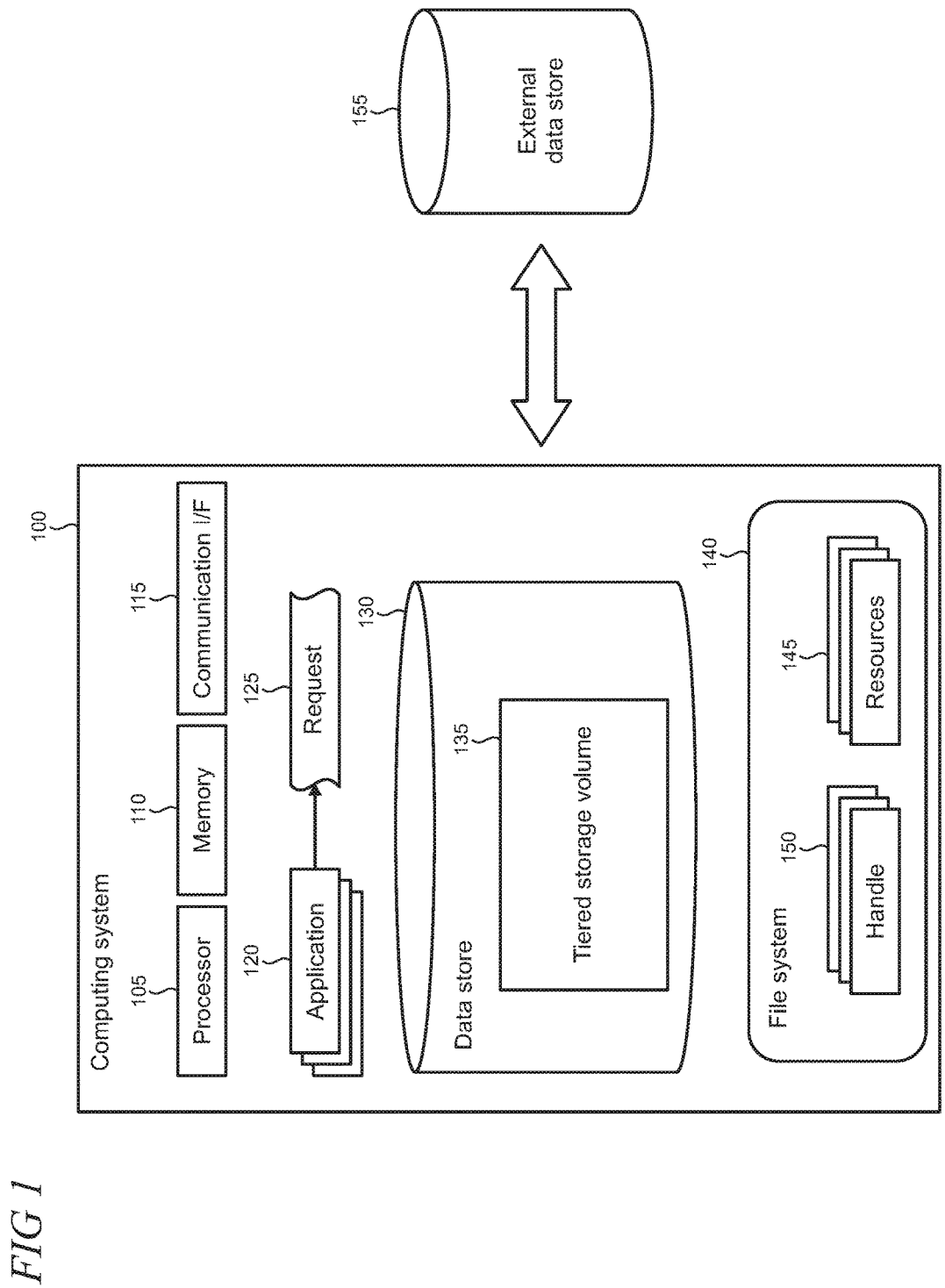
FIG. 1 shows an illustrative computing system architecture which may be utilized to support the present file system for shingled magnetic recording (SMR)

As illustrated in FIG. 1, a computing system 100 typically includes at least one processing unit 105 and a memory device 110. The memory device 110 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to actions that are performed by one or more computing systems. If such actions are implemented in software, one or more processors of the associated computing system that performs the action direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 110 of the computing system 100. Computing system 100 may also contain communication channels that allow the computing system 100 to communicate with other message processors over a wired or wireless network.

Embodiments described herein may comprise or utilize a special-purpose or general-purpose computing system that includes computer hardware, such as, for example, one or more processors and system memory, as discussed in greater detail below. The system memory may be included within the overall memory 110. The system memory may also be referred to as "main memory" and include memory locations that are addressable by the at least one processing unit 105 over a memory bus in which case the address location is asserted on the memory bus itself. System memory has been traditionally volatile, but the principles described herein also apply in circumstances in which the system memory is partially, or even fully, non-volatile.

Embodiments within the scope of the present file system also include physical and other computer-readable media for carrying or storing computer-executable instructions and/or data structures. Such computer-readable media can be any available media that can be accessed by a general-purpose or special-purpose computing system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as random access memory (RAM), read-only memory (ROM), electrically erasable programmable read-only memory (EEPROM), solid-state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computing system to implement the disclosed functionality of the invention. For purposes of this specification and the claims, the phrases "computer storage media," "computer-readable storage media," "computer-readable memory devices" and variations thereof, do not include waves, signals, and/or other transitory and/or intangible communication media.

Transmission media can include a network and/or data links which can be used to carry program code in the form of computer-executable instructions or data structures, and which can be accessed by a general-purpose or special-purpose computing system. A "network" is defined as one or more data links that enable the transport of electronic data between computing systems and/or modules and/or other electronic devices. When information is transferred or provided over a network or another communications connection (either hardwired, wireless, or a combination of hardwired and wireless) to a computing system, the computing system may view the connection as transmission media. Combinations of the above should also be included within the scope of computer-readable media.

In addition, upon reaching various computing system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a NIC), and then eventually transferred to computing system RAM and/or to less volatile computer storage media in a computing system. Thus, computer storage media can be included in computing system components that also (or even primarily) utilize transmission media in some cases.

Computer-executable instructions comprise, for example, instructions and data which, when executed at one or more processors, cause a general-purpose computing system, special-purpose computing system, or special-purpose processing device to perform a certain function or group of functions. Computer-executable instructions may be, for example, binaries, intermediate format instructions such as assembly language, or even source code.

Those skilled in the art may appreciate that the principles described herein may be practiced in network computing environments with many types of computing system configurations, including PCs, desktop computers, laptop computers, tablet computers, message processors, hand-held devices, multi-processor systems, microprocessor-based or programmable consumer electronics, network PCs, minicomputers, mainframe computers, mobile telephones, smartphones, Personal Digital Assistants (PDAs), wearable computing devices, smartwatches, bands, head-mounted displays (HMDs), smart glasses, pagers, routers, switches, and the like. The present arrangement may also be practiced in distributed system environments where both local and remote computing systems, which are linked (either by hardwired data links, wireless data links, or by a combination of hardwired and wireless data links) through a network, perform tasks. As such, in a distributed system environment, a computing system may include a plurality of constituent computing systems. In a distributed system environment, program modules may be located in both local and remote memory storage devices.

Those skilled in the art may also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

System architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Continuing with the description of FIG. 1, computing system 100 may be any type of local or distributed computing system, including a cloud computing system. The computing system 100 includes components for performing a variety of different functions. For instance, a communications interface (I/F) 115 may be configured to enable communications with other computing systems and devices. The communications I/F 115 may include any wired or wireless communication means that can receive and/or transmit data to or from other computing systems and devices. The communications I/F 115 may be configured to interact with databases, mobile computing devices (such as mobile phones, smartphones, wearable computers, tablets, etc.), embedded, or other types of computing systems and devices.

The computing system 100 further includes applications 120. These may be any type of software application, service or other portion of software code functionality. The applications 120 may send requests 125, for example requests for reading and writing or other input/output (I/O), to a data store 130. The requests may also originate from another computing system or another application outside of computing system 100. As shown in FIG. 2, the requests 125 may comprise any of a variety of actions and/or operations to a file including create 205, delete 210, write 215, duplicate or clone 220, modify 225, truncate 230, and other suitable actions/operations 235. The actions shown in FIG. 2 are illustrative and do not represent an exhaustive listing of requests that may be utilized.

Returning to FIG. 1, the data store 130 may comprise any amount of data from any of a variety of different data types. The data store may be implemented using individual storage devices such as hard drives, solid-state drives (such as flash drives), optical drives (such as DVDs or Blu-Ray discs), hybrid drives, or other data storage devices. The portions of data storage may also include temporary storage such as random access memory (RAM), physical caches (such as processor caches), or any other type of data store that can temporarily or permanently store data.

The data store 130 may be addressed by applications as a single data store, even though the data store itself includes different logical portions and/or different physical portions. For example, the data store 130 may be an array of hard drives, or be implemented using different logical portions of the hard drive (disk) array, where the logical portions may span multiple physical drives, or may be different logical portions of the same drive. The data store 130 can further comprise external data stores 155 that are instantiated separately from the computing system 100 or be implemented in whole, or part, as cloud-computing resources. In this example, the data store is arranged using a tiered storage volume 135 that uses hybrid storage media of different types. Generally, the tiered storage volume 135 can include a portion that is configured for random writes and another portion that is configured for sequential writes.

FIG. 3 shows a block diagram of illustrative memory and storage arrangement 300 that may be instantiated on a computing system 100. The arrangement 300 is illustrative and the particular number and types of memory and storage devices used in any given deployment can vary. As shown, a cache 305 may be associated with a central processing unit (CPU) in the computing system 100. Traditional memory including dynamic RAM as well as non-volatile memory such as PCM (collectively referred to by reference numeral 310) may be supported. One or more hard disk drives (HDD) 315 may be supported. In this illustrative example, the tiered storage volume 135 includes two tiers—a tier comprising a randomly-writeable data store using CMR and/or SSD (referred to herein as SSD/CMR 320) and a tier comprising an SMR disk 325. In other deployments, other combinations of memories and storage may be used to implement a given tiered storage volume.

Figure 4:
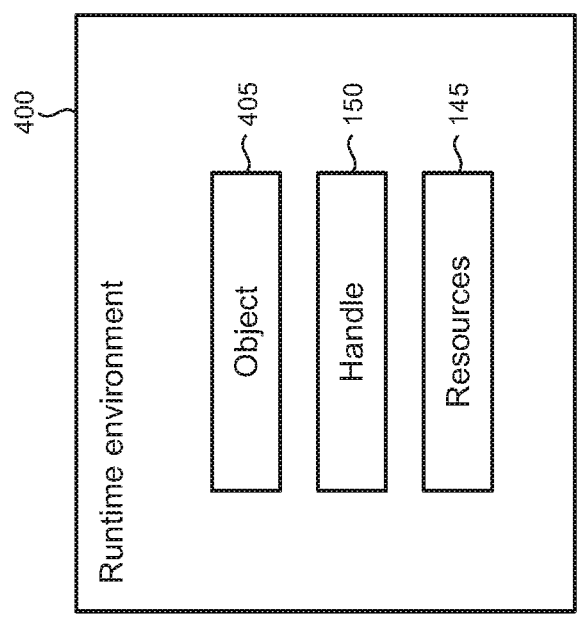
FIG. 4 shows illustrative relationships between components in a runtime environment 400 that is supported on a computing system.

Returning again to FIG. 1, the computing system 100 further includes a file system 140 that provides various features, functions, capabilities, and resources (shown collectively as resources 145) to the applications 120 by exposing handles 150 to the applications. FIG. 4 shows illustrative relationships between components in a runtime environment 400 that is supported on the computing system 100 (FIG. 1). The system uses objects 405 and handles 150 to regulate access to file system resources 145, system resources, and other resources. The file system controls operations in a secure manner by implementing access to the sources by an object. A file is one example of an object. Each object will typically be associated with an access-control list (ACL) or other suitable resource or component that specifies the actions that a given computing system process can perform on the file. The system will inspect the object's ACL each time an application takes a handle 150 to the object.

Figure 5:
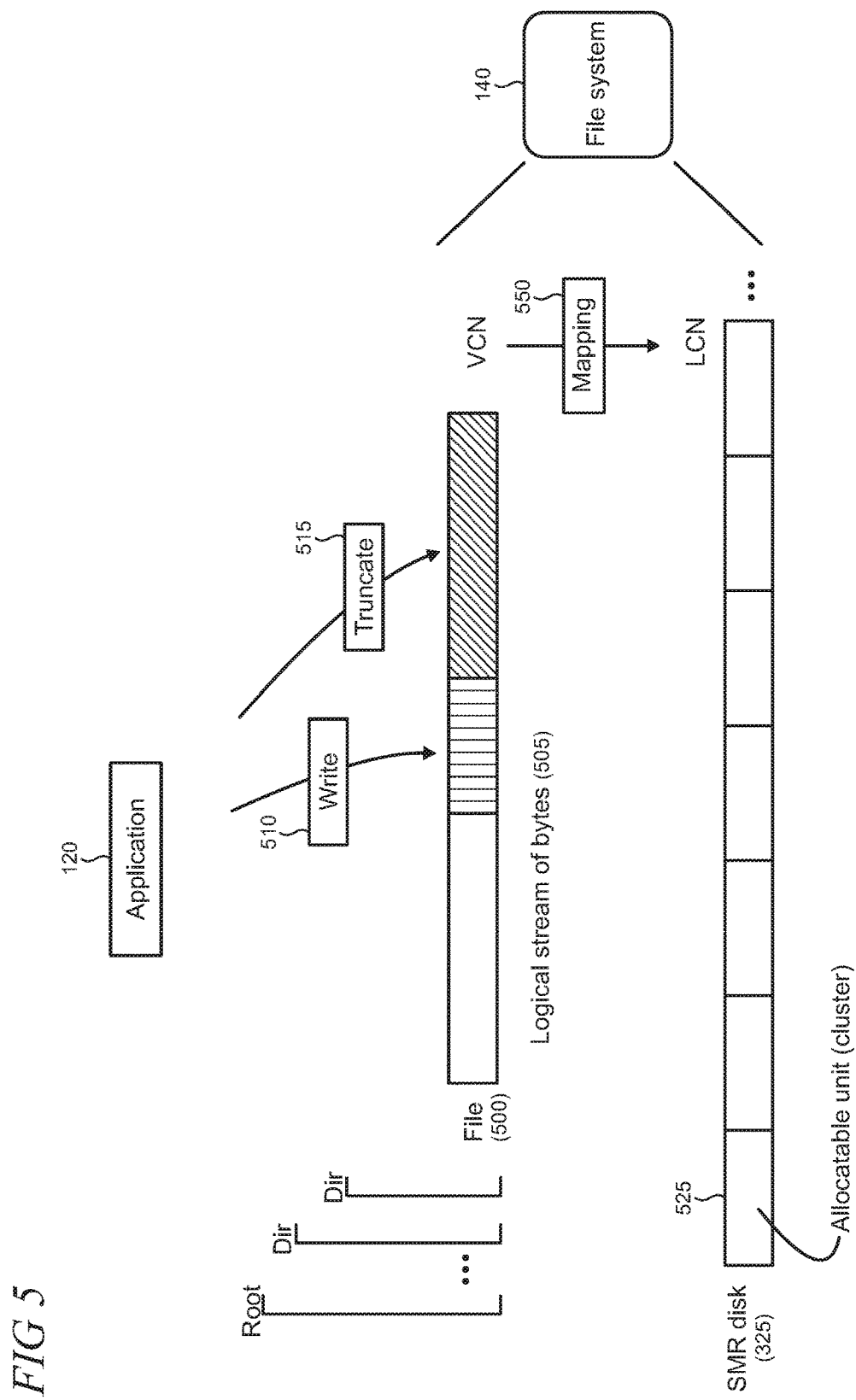
FIG. 5 shows an illustrative abstraction of a file that is exposed by a file system to an application.

As shown in FIG. 5, a function of the file system 140 is to expose semantics in which a given file 500 may be viewed by an application 120 as a logical stream of bytes 505. In the application's abstract view, the file sits within a hierarchical namespace that supports various directories. The application can create a handle to the file object, for example, to write new data to the file (indicated by reference numeral 510) or truncate the file 515. The file system 140 manages the underlying processes at the disk level of the computing system to implement the file abstraction seen by the application into real actions on the SMR disk 325.

Figure 6:
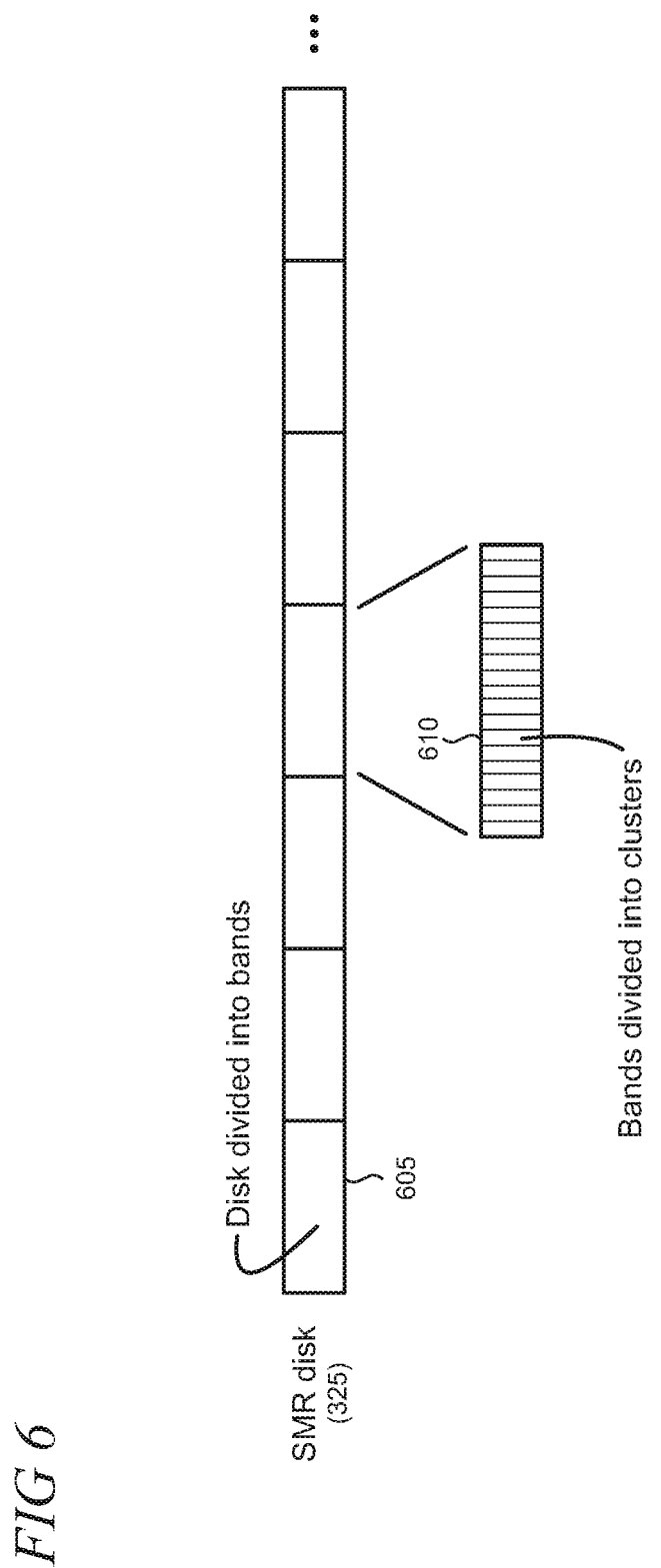
FIG. 6 shows an illustrative storage volume that is divided into bands and sub-divided into clusters.

The SMR disk 325 uses a non-hierarchical, flat namespace that is logically viewed as a collection of blocks, or allocatable units (representatively indicated by reference numeral 525). In this illustrative example, the allocatable units can be sized from 4 KB to 64 KB and are referred to as "clusters." As shown in FIG. 6, the SMR disk 325 may be divided into bands (representatively indicated by reference numeral 605) which are large relative to typical I/O, for example, 256 MB. Each band 605 is further subdivided into clusters 610.

Clusters are an internal unit allocation, and the file system 140 essentially divides the byte stream 505 (FIG. 5) into cluster-sized chunks. The file system organizes storage volumes based on cluster size which represents the smallest amount of disk space that can be allocated to hold a file. As files are not referenced at a byte granularity, the cluster is the smallest unit of size that the file system can reference when accessing a data store. Different cluster sizes can be utilized for a given deployment of the present file system for SMR, as different sized clusters can offer different performance benefits.

Clusters may be referred to from two different perspectives: from within the file, and from within the volume (i.e., the SMR disk). Any cluster in a file has a virtual cluster number (VCN), which is its relative offset from the beginning of the file. For example, a seek to twice the size of a cluster, followed by a read, will return data beginning at the third VCN. A logical cluster number (LCN) describes the offset of a cluster from the beginning of the volume. The file system 140 performs the appropriate mapping from VCN to LCN, as indicated by reference numeral 550 in FIG. 5, to support the file system semantics exposed to the application 120.

Figure 7:
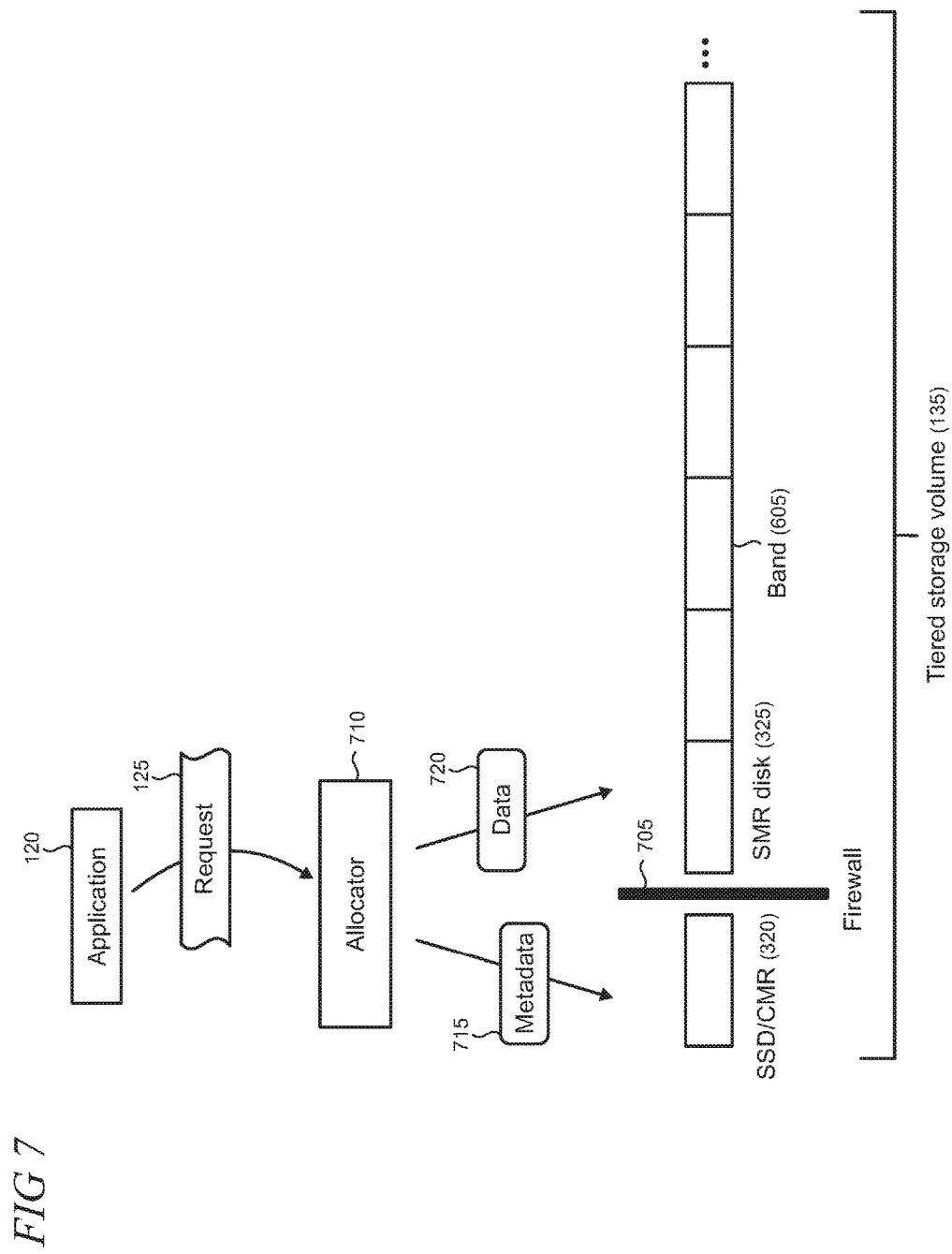
FIG. 7 shows an illustrative embodiment in which a file system establishes a logical firewall between the SSD/CMR and SMR disk portions of a tiered storage volume.

FIG. 7 shows an illustrative embodiment of the present file system for SMR in which the file system 140 (FIG. 1) establishes a firewall 705 between the SSD/CMR 320 and SMR disk 325 tiers of the storage volume 135. The firewall 705 implements allocation logic so that an allocator 710 will only allocate from the SSD/CMR tier to store metadata, and only allocate from the SMR tier to store file data. Metadata can typically be several orders of magnitude smaller than file data. Thus, for example, SMR disk storage using efficient sequential write can be well suited for file storage, but represent a less optimal method for storing small data sets such as metadata.

The present file system for SMR improves the functionality of the file system for handling relatively small data sets by configuring the allocator 710 to manage allocation based on data type. When an application 120 makes a file operation request 125, the allocator inspects the request to determine the associated underlying data type. If the inspection shows that the request is associated with metadata 715, then the allocator 710 allocates a suitable space on the SSD/CMR 320 to support the requested file operation. the inspection shows that the request is associated with metadata, then the allocator 710 allocates a suitable space on the SMR disk 325 to support the requested file operation. The firewall 705 provides that the file data and metadata allocation logic is kept separate and distinct. This further enables the state of each data store in the tiered storage to be separately maintained.

Figure 8:
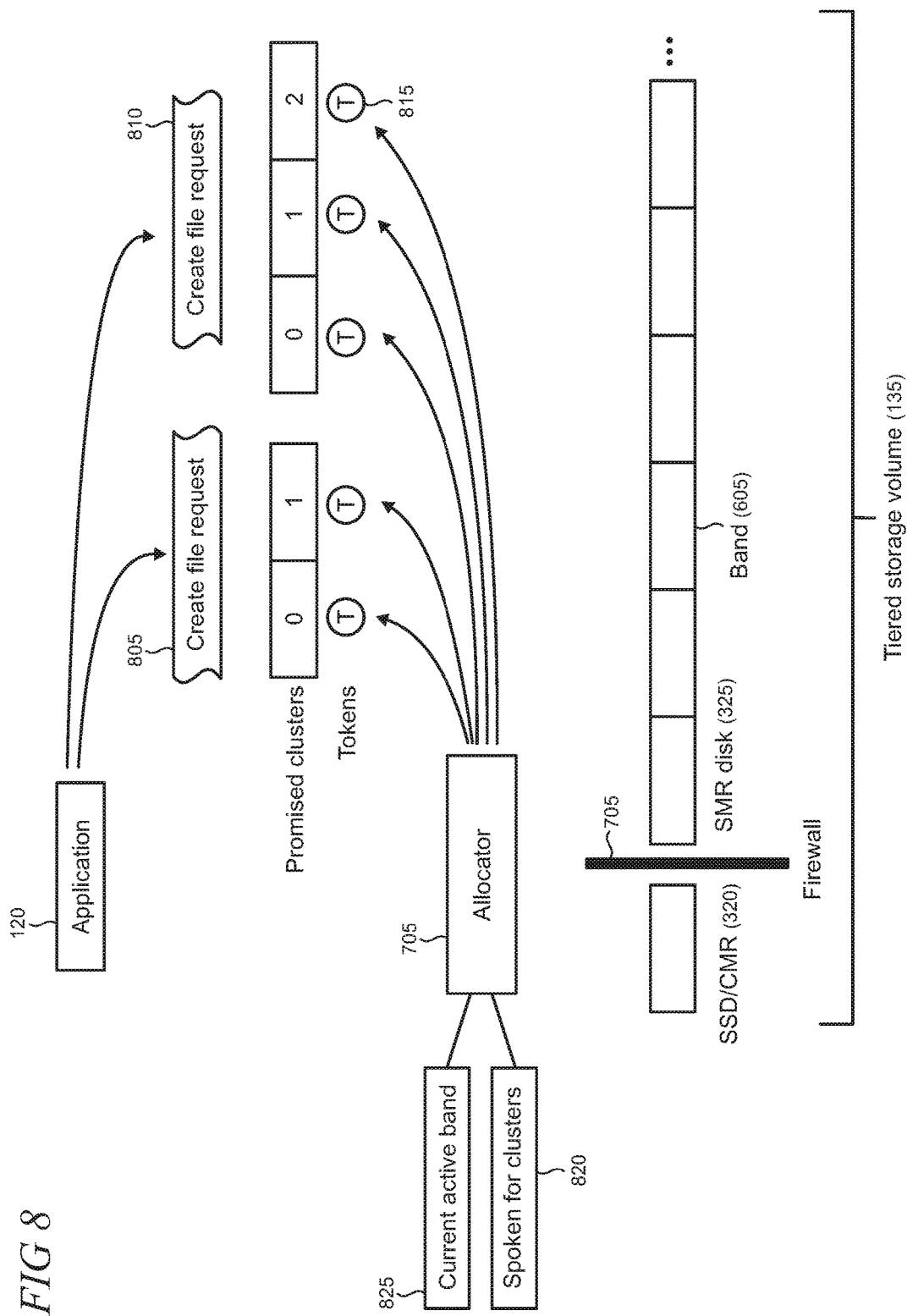
FIG. 8 shows an illustrative embodiment in which deferred allocation is implemented.

FIG. 8 shows an illustrative embodiment of the present file system for SMR in which deferred allocation is implemented. In an exemplary scenario, an application 120 generates multiple requests 805 and 810 to create files. For a regular, non-deferred allocation, the allocator 710 typically performs a suitable allocation and makes a corresponding entry in a file allocation table or bit map in response to the create file request from the application. By contrast, with deferred allocation, the allocator examines the requests to determine the numbers of clusters that are needed to meet the request and then returns a promise for a guaranteed allocation of the needed clusters.

In this illustrative embodiment, the allocator 710 provides a promise token (representatively indicated by reference numeral 815) for each promised cluster or group of clusters. The allocator tracks the promised allocations (i.e., the "spoken for" clusters) in a separately maintained table 820 and typically does not update the file allocation table or bitmap used for actual allocation. When an I/O stream from the application 120 containing write data is presented to the file system, the promise token 815 can be exchanged for an actual allocation on the tiered storage volume 135. The allocator can also track the currently active band 825 so that accumulated writes from the deferred allocation can be initiated a suitable location on the SMR disk 325.

Figure 9:
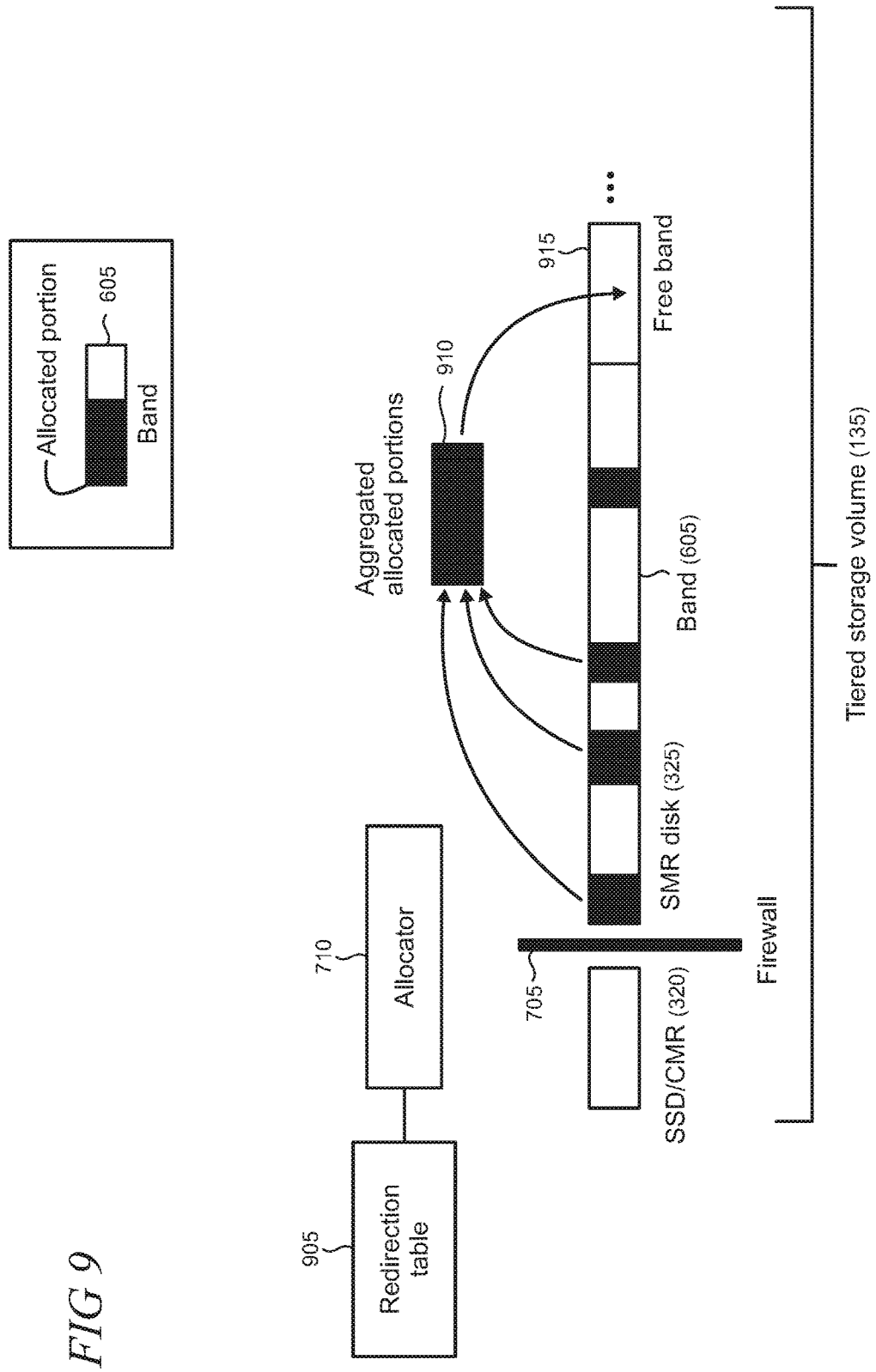
FIG. 9 shows an illustrative embodiment in which a redirection table is utilized to enable compaction to be applied to an SMR disk to free up space for new data.

FIG. 9 shows an illustrative embodiment of the present file system for SMR in which a redirection table 905 is utilized to enable compaction to be applied to the SMR disk 325 to free up space for new data. The redirection table 905 lets the allocator 710 track file contents within allocated portions of bands (the allocated portions of bands in the SMR disk 325 are shown in black in the drawing). Because of the dynamic behavior of files and applications, holes can typically open up in the bands over time. The allocator 710 is configured to aggregate the remaining allocated portions of the bands, as shown by reference numeral 910. The aggregated allocated portions may then be rewritten sequentially, dynamically in real time, into a free band 915. The rewrites are performed in an efficient sequential manner to thereby squeeze out free space to realize additional storage density on the SMR disk.

The compaction methodology shown in FIG. 9 and described above provides for file data to be optimally organized on disk. The redirection table 905 provides for efficient tracking and utilization of free space on the SMR disk to ensure better cohesion of files with improved storage density.

Figure 10:
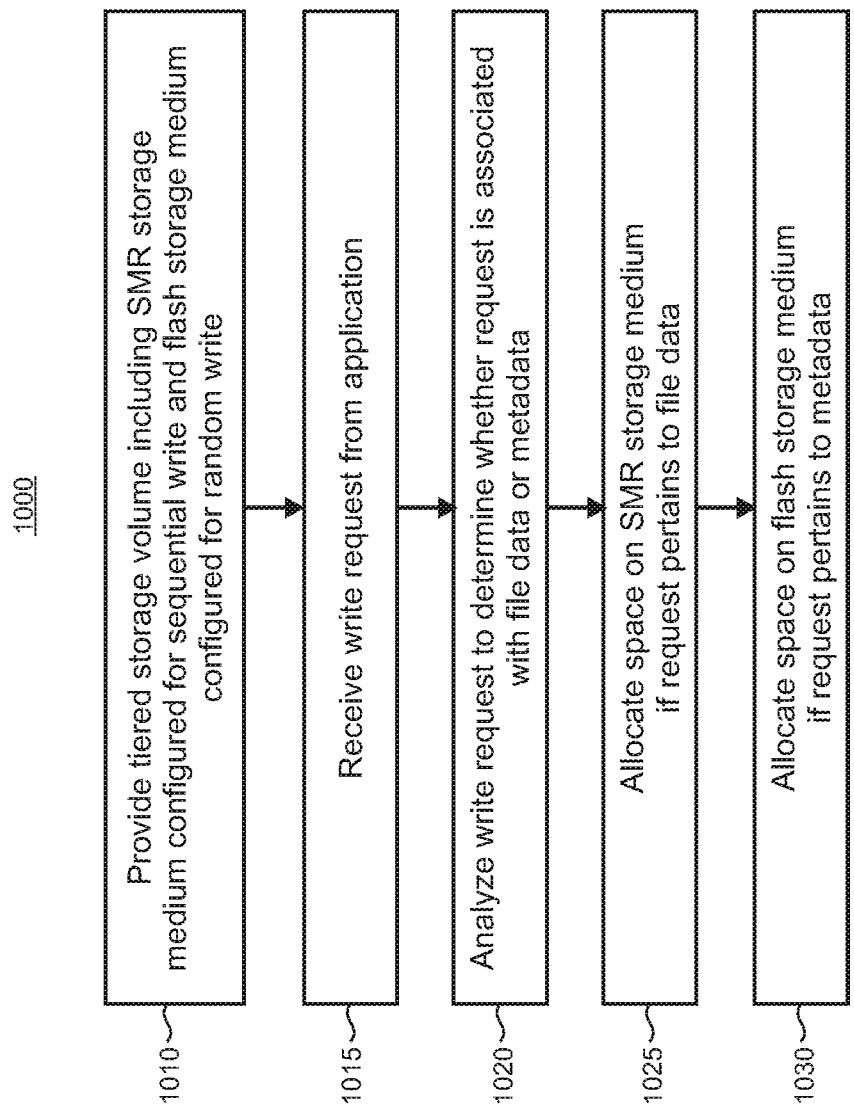
FIGS. 10-12 show flowcharts of illustrative methods which may be used when implementing the present file system with SMR.

FIG. 10 is a flowchart of an illustrative method 1000 that may be implemented by a file system that is configured to efficiently manage data stored using SMR. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1010, a storage volume having at least two tiers is provided. One tier includes an SMR storage medium, such as SMR disk, that is configured exclusively for sequential write. The other tier includes a flash storage medium that is configured for random write. In step 1015, a write request from an application is received. In step 1020, the write request is analyzed to determine whether the request pertains to file data or metadata.

In step 1025, based on the determination, space is allocated (e.g., by the allocator 710 in FIG. 7) on the SMR storage medium if the request pertains to file data. Otherwise, in step 1030, if the request pertains to metadata, then space is allocated on the flash storage medium.

Figure 11:
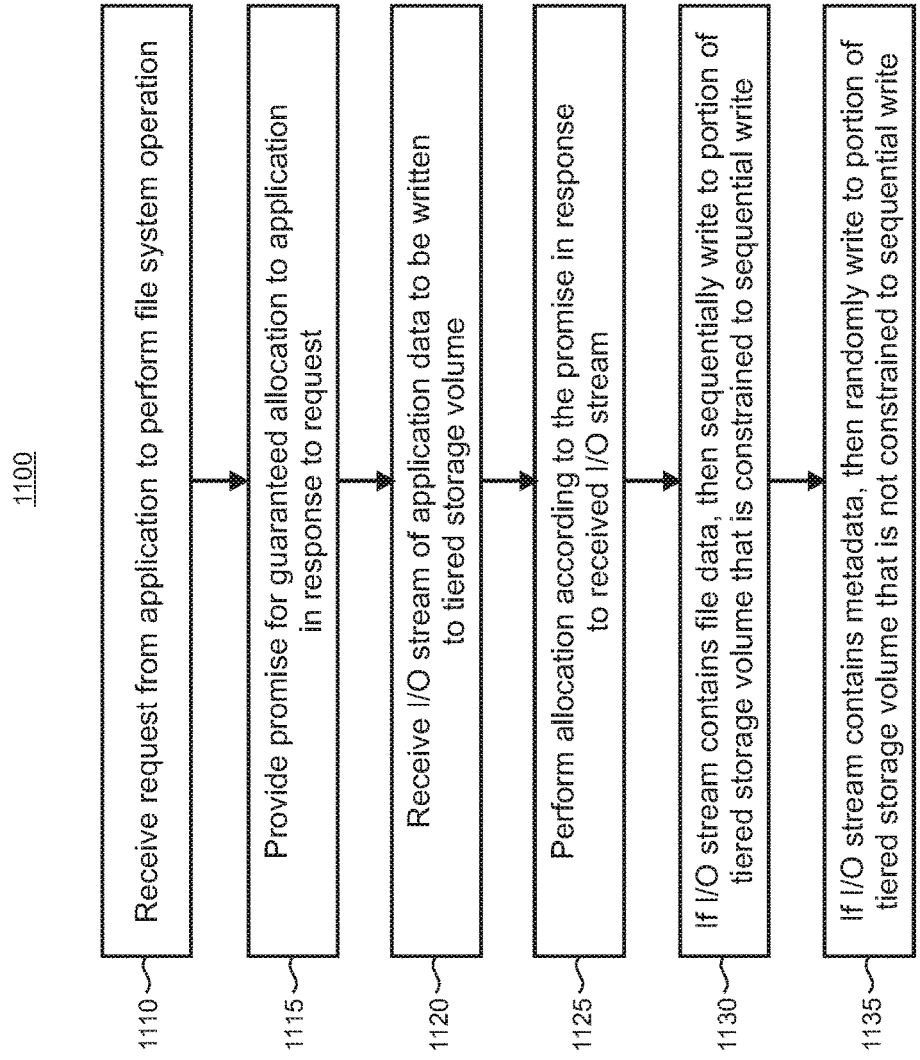

FIG. 11 is a flowchart of an illustrative method 1100 that may be implemented by a computing system to practice deferred allocation. In step 1110, a file operation request is received from an application executing on the computing system. In step 1115, a promise is made to the application in response to the request, in which the promise provides a guaranteed allocation of a suitable space on a tiered storage volume. For example, the tiered storage volume can include an SMR disk portion that is constrained to sequential write operations and an SSD/CMR portion that is not so constrained.

In step 1120, an I/O stream of application data to be written to the tiered storage volume is received. In response to the received I/O stream, in step 1125, an allocation of suitable space is performed according to the promise. In step 1130, if the application data from the I/O stream is file data, then the application data is sequentially written to the constrained portion (e.g., the SMR disk) of the tiered storage volume. In step 1135, if the application data in the I/O stream is metadata, then the application data is randomly written to the unconstrained portion (e.g., the SSD/CMR) of the tiered storage volume.

Figure 12:
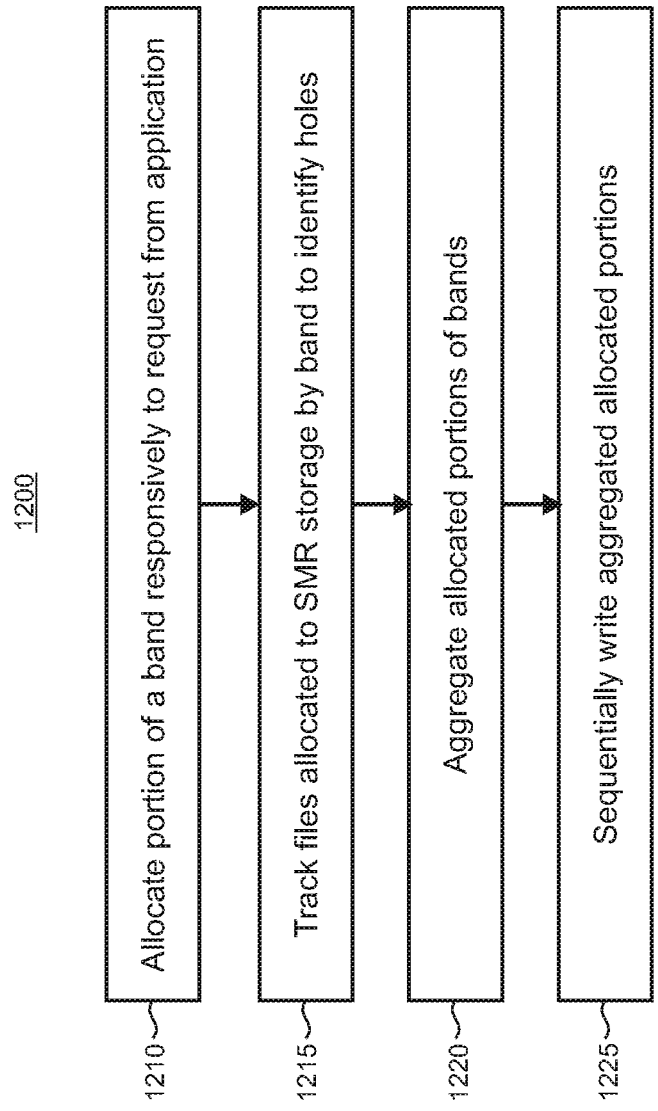

FIG. 12 is a flowchart of an illustrative method 1200 that may be implemented by a computing system to practice SMR disk compaction to free up space and improve storage density. In step 1210, space is allocated on a band of an SMR storage medium responsively to an application request. In step 1215, files written to the SMR storage medium are tracked on a band-by-band basis to identify holes in the bands. In step 1220, the allocated portions of tracked bands are aggregated. The aggregated allocated band portions are sequentially rewritten, in step 1225, to a free band on the SMR storage medium.

Figure 13:
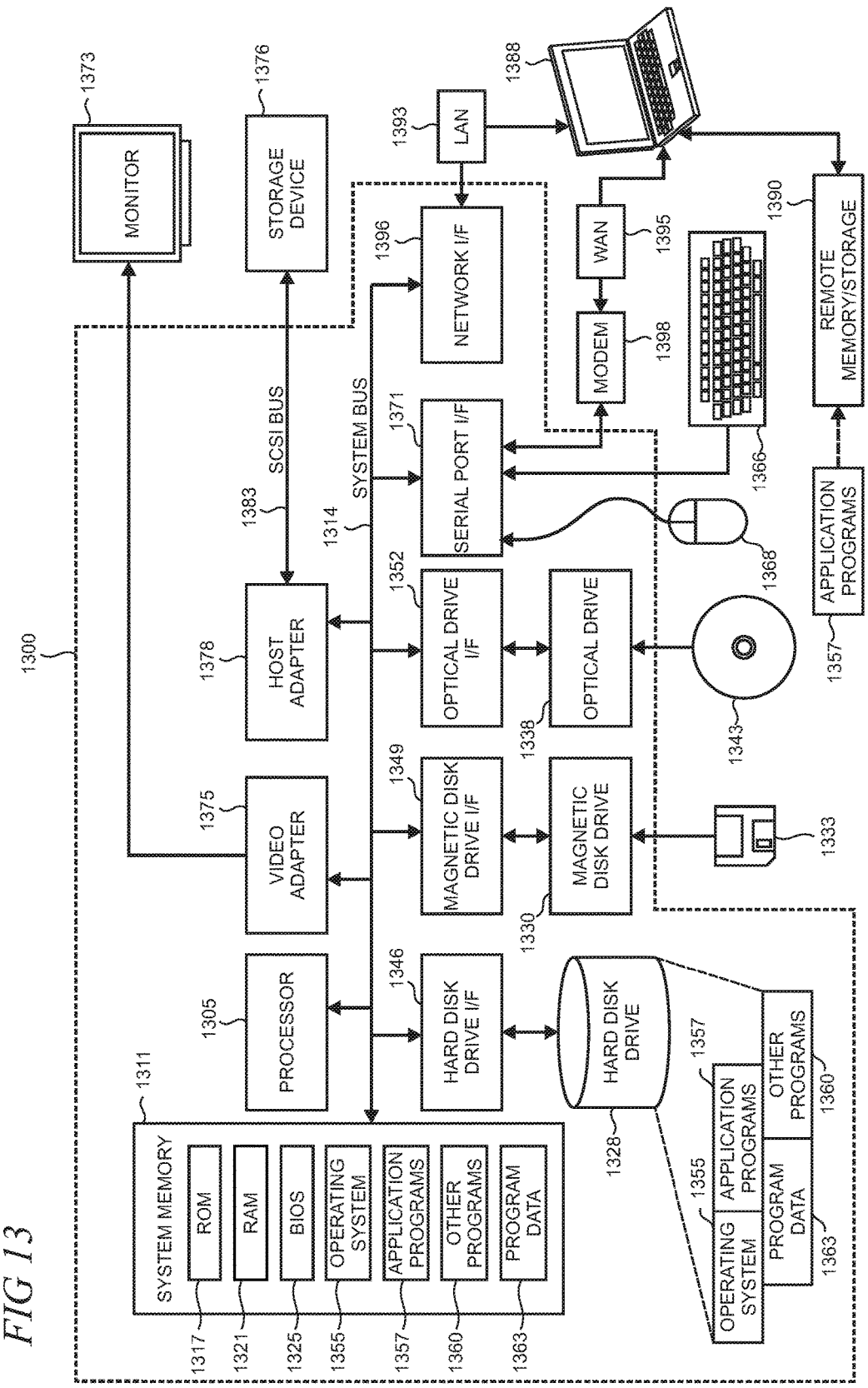
FIG. 13 is a simplified block diagram of an illustrative computing system such as a personal computer (PC) that may be used in part to implement the present file system for SMR.

FIG. 13 is a simplified block diagram of an illustrative computing system 1300 such as a PC, client machine, or server with which the present file system for SMR may be implemented. Computing system 1300 includes a processor 1305, a system memory 1311, and a system bus 1314 that couples various system components including the system memory 1311 to the processor 1305. The system bus 1314 may be any of several types of bus structures including a memory bus or memory controller, a peripheral bus, or a local bus using any of a variety of bus architectures. The system memory 1311 includes read only memory (ROM) 1317 and random access memory (RAM) 1321. A basic input/output system (BIOS) 1325, containing the basic routines that help to transfer information between elements within the computing system 1300, such as during startup, is stored in ROM 1317. The computing system 1300 may further include a hard disk drive 1328 for reading from and writing to an internally disposed hard disk (not shown), a magnetic disk drive 1330 for reading from or writing to a removable magnetic disk 1333 (e.g., a floppy disk), and an optical disk drive 1338 for reading from or writing to a removable optical disk 1343 such as a CD (compact disc), DVD (digital versatile disc), or other optical media. The hard disk drive 1328, magnetic disk drive 1330, and optical disk drive 1338 are connected to the system bus 1314 by a hard disk drive interface 1346, a magnetic disk drive interface 1349, and an optical drive interface 1352, respectively. The drives and their associated computer-readable storage media provide non-volatile storage of computer-readable instructions, data structures, program modules, and other data for the computing system 1300. Although this illustrative example includes a hard disk, a removable magnetic disk 1333, and a removable optical disk 1343, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present task automation using location-awareness of multiple devices. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 1333, optical disk 1343, ROM 1317, or RAM 1321, including an operating system 1355, one or more application programs 1357, other program modules 1360, and program data 1363. A user may enter commands and information into the computing system 1300 through input devices such as a keyboard 1366 and pointing device 1368 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1305 through a serial port interface 1371 that is coupled to the system bus 1314, but may be connected by other interfaces, such as a parallel port, game port, or universal serial bus (USB). A monitor 1373 or other type of display device is also connected to the system bus 1314 via an interface, such as a video adapter 1375. In addition to the monitor 1373, personal computers typically include other peripheral output devices (not shown), such as speakers and printers. The illustrative example shown in FIG. 13 also includes a host adapter 1378, a Small Computer System Interface (SCSI) bus 1383, and an external storage device 1376 connected to the SCSI bus 1383.

The computing system 1300 is operable in a networked environment using logical connections to one or more remote computers, such as a remote computer 1388. The remote computer 1388 may be selected as another personal computer, a server, a router, a network PC, a peer device, or other common network node, and typically includes many or all of the elements described above relative to the computing system 1300, although only a single representative remote memory/storage device 1390 is shown in FIG. 13. The logical connections depicted in FIG. 13 include a local area network (LAN) 1393 and a wide area network (WAN) 1395. Such networking environments are often deployed, for example, in offices, enterprise-wide computer networks, intranets, and the Internet.

When used in a LAN networking environment, the computing system 1300 is connected to the local area network 1393 through a network interface or adapter 1396. When used in a WAN networking environment, the computing system 1300 typically includes a broadband modem 1398, network gateway, or other means for establishing communications over the wide area network 1395, such as the Internet. The broadband modem 1398, which may be internal or external, is connected to the system bus 1314 via a serial port interface 1371. In a networked environment, program modules related to the computing system 1300, or portions thereof, may be stored in the remote memory storage device 1390. It is noted that the network connections shown in FIG. 13 are illustrative and other means of establishing a communications link between the computers may be used depending on the specific requirements of an application of the present file system for SMR.

Various exemplary embodiments of the present file system for shingled magnetic recording are now presented by way of illustration and not as an exhaustive list of all embodiments. An example includes a computer-implemented method for efficiently managing data storage, comprising: providing a storage volume that includes at least two tiers, a first tier including a shingled magnetic recording (SMR) storage medium configured exclusively for sequential write, and a second tier including a flash storage medium configured for random write; receiving a write request from an application; analyzing the write request to determine whether the write request pertains to file data or metadata; based on the determination, allocating space on the SMR storage medium if the write request pertains to file data; and based on the determination, allocating space on the flash storage medium if the write request pertains to metadata.

In another example, the computer-implemented method further includes writing the file data to the SMR storage medium in the allocated space, in which the writing is performed sequentially. In another example, the computer-implemented method further comprises maintaining a redirection table to perform compaction of the SMR storage medium. In another example, the computer-implemented method further includes writing the metadata to the flash storage medium in the allocated space, in which the writing is performed randomly. In another example, the computer-implemented method further includes deferring allocation of space on one of the SMR storage medium or flash storage medium by providing a promise for guaranteed allocation in response to the write request. In another example, the computer-implemented method further includes converting the promise to an actual allocation upon receipt of an input/output (I/O) stream from the application. In another example, writing operations to the SMR storage medium or flash storage medium are initiated upon receipt of the I/O stream.

A further example includes a computing system, comprising: one or more processors; a tiered storage volume including hybrid storage media configured for storing files; and one or more hardware-based memory devices storing instructions which, when executed by the one or more processors, cause the computing system to: receive a request from an application executing on the computing system for an operation to a file, in response to the request, provide a promise to the application for a guaranteed allocation on the tiered storage volume to support the file operation, receive an input/output (I/O) stream including data from the application for writing to the tiered storage volume, allocate space on the tiered storage volume according to the promise in response to the received I/O stream, perform a sequential write of the application data in an allocated space in a portion of the tiered storage volume that is constrained to sequential write operations when the application data comprises file data, and randomly write the application data in an allocated space on a portion of the tiered storage volume that is not constrained to sequential write operations when the application data comprises metadata.

In another example, the portion of the tiered storage volume that is constrained to sequential write operations includes a shingled magnetic recording (SMR) disk. In another example, the executed instructions further cause the computing system to perform allocations that are contiguous within the SMR disk. In another example, the executed instructions further cause the computing system to track the guaranteed allocations to perform one or more allocation-upon-write operations. In another example, the portion of the tiered storage volume that is not constrained to sequential write operations includes a solid-state drive (SSD) or a conventional magnetic recording (CMR) disk. In another example, the executed instructions further cause the computing system to batch guaranteed allocations among a plurality of requests prior to performing the sequential write. In another example, In another example, the executed instructions further cause the computing system to refrain from modifying an allocation or bitmap when providing the promise. In another example, the request is one of creating a new file, writing to a file, truncating a file, modifying a file, or deleting a file.

A further example includes one or more computer-readable storage media not consisting of propagated signals storing computer-executable instructions which, when executed by one or more processors disposed in an electronic device having at least one shingled magnetic recording (SMR) storage medium, cause the device to: responsively to a request from an application executing on the electronic device, allocate a portion of a band maintained on the SMR storage medium for a file operation, in which the band stores a plurality of files and the SMR storage medium maintains a plurality of bands; track the plurality of files allocated to the SMR storage medium, by band, to identify occurrences of holes in the bands; aggregate allocated portions of a plurality of bands; sequentially write the aggregated allocated band portions to a free band on the SMR storage medium.

In another example, the band comprises a logically specified portion of the SMR storage medium and in which a redirection table is used for tracking and to indicate an identity and location for each band. In another example, the aggregating is performed when holes appear in the bands that meet a predetermined threshold for size or number. In another example, the aggregating is performed for bands that meet a predetermined threshold for age. In another example, the electronic device further includes a non-SMR-based storage medium and the executed instructions further cause the device to write metadata to the non-SMR-based storage medium and cause the device to suppress writing of metadata to the SMR storage medium.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for efficiently managing data storage, comprising:
   providing a storage volume that includes at least two tiers, a first tier including a shingled magnetic recording (SMR) storage medium configured exclusively for sequential write, and a second tier including a flash storage medium configured for random write;
   receiving a write request from an application;

analyzing the write request to determine whether the write request pertains to file data or metadata;

based on the determination, providing a promise for guaranteed allocation of space on the SMR storage medium responsive to the write request pertaining to file data; and based on the determination, providing a promise for guaranteed allocation of space on the flash storage medium responsive to the write request pertaining to metadata.

2. The computer-implemented method of claim 1 further including:

allocating the space on the SMR storage medium; and writing the file data to the SMR storage medium in the allocated space, in which the writing is performed sequentially.

3. The computer-implemented method of claim 2 further comprising maintaining a redirection table to perform compaction of the SMR storage medium.

4. The computer-implemented method of claim 1 further including:

allocating the space on the flash storage medium; and writing the metadata to the flash storage medium in the allocated space, in which the writing is performed randomly.

5. The computer-implemented method of claim 1 further including converting the promise to an actual allocation upon receipt of an input/output (I/O) stream from the application.

6. The computer-implemented method of claim 5 in which writing operations to the SMR storage medium or flash storage medium are initiated upon receipt of the I/O stream.

7. A computing system, comprising:

one or more processors;

a tiered storage volume including hybrid storage media configured for storing files; and one or more hardware-based memory devices storing instructions which, when executed by the one or more processors, cause the computing system to:

receive a request from an application executing on the computing system for an operation to a file, in response to the request, provide a promise to the application for a guaranteed allocation on the tiered storage volume to support the file operation, receive an input/output (I/O) stream including data from the application for writing to the tiered storage volume, allocate space on the tiered storage volume according to the promise in response to the received I/O stream, perform a sequential write of the application data in an allocated space in a portion of the tiered storage volume that is constrained to sequential write operations when the application data comprises file data, and randomly write the application data in an allocated space on a portion of the tiered storage volume that is not constrained to sequential write operations when the application data comprises metadata.

8. The computing system of claim 7 in which the portion of the tiered storage volume that is constrained to sequential write operations includes a shingled magnetic recording (SMR) disk.

9. The computing system of claim 8 in which the executed instructions further cause the computing system to perform allocations that are contiguous within the SMR disk.

10. The computing system of claim 7 in which the executed instructions further cause the computing system to track the guaranteed allocations to perform one or more allocation-upon-write operations.

11. The computing system of claim 7 in which the portion of the tiered storage volume that is not constrained to sequential write operations includes a solid-state drive (SSD) or a conventional magnetic recording (CMR) disk.

12. The computing system of claim 7 in which the executed instructions further cause the computing system to batch guaranteed allocations among a plurality of requests prior to performing the sequential write.

13. The computing system of claim 7 in which the executed instructions further cause the computing system to refrain from modifying an allocation or bitmap when providing the promise.

14. The computing system of claim 7 in which the request is one of creating a new file, writing to a file, truncating a file, modifying a file, or deleting a file.

15. One or more computer-readable storage media not consisting of propagated signals storing computer-executable instructions which, when executed by one or more processors disposed in an electronic device having at least one shingled magnetic recording (SMR) storage medium, cause the device to:

responsively to a request from an application executing on the electronic device, provide a promise to allocate a portion of a band maintained on the SMR storage medium for a file operation, in which the band stores a plurality of files and the SMR storage medium maintains a plurality of bands;

allocate the portion of the band according to the provided promise;

track the plurality of files allocated to the SMR storage medium, by band, to identify occurrences of holes in the bands;

aggregate allocated portions of a plurality of bands; and sequentially write the aggregated allocated band portions to a free band on the SMR storage medium.

16. The one or more computer-readable storage media of claim 15 in which the band comprises a logically specified portion of the SMR storage medium and in which a redirection table is used for tracking and to indicate an identity and location for each band.

17. The one or more computer-readable storage media of claim 15 in which the aggregating is performed when holes appear in the bands that meet a predetermined threshold for size or number.

18. The one or more computer-readable storage media of claim 15 in which the aggregating is performed for bands that meet a predetermined threshold for age.

19. The one or more computer-readable storage media of claim 15 in which the electronic device further includes a non-SMR-based storage medium and the executed instructions further cause the device to write metadata to the non-SMR-based storage medium and cause the device to suppress writing of metadata to the SMR storage medium.

* * * * *